United States Patent [19]

Racicot

[11] Patent Number: 4,602,693
[45] Date of Patent: Jul. 29, 1986

[54] PORTABLE SCALES

[76] Inventor: Robert G. Racicot, P.O. Box 892, Holbrook, Ariz. 86025

[21] Appl. No.: 678,020

[22] Filed: Dec. 4, 1984

[51] Int. Cl.⁴ .................... G01G 21/24; G01G 21/32
[52] U.S. Cl. .................................... 177/262; 177/255
[58] Field of Search ............... 177/262, 239, 244, 255

[56] References Cited

U.S. PATENT DOCUMENTS

| | | | |
|---|---|---|---|
| 25,203 | 8/1859 | Kelly | 177/262 |
| 1,853,198 | 4/1932 | Breaden | 177/262 X |
| 4,120,371 | 10/1978 | Zohn et al. | 177/262 |
| 4,363,371 | 12/1982 | Hutchinson | 177/262 |

Primary Examiner—E. A. Goldberg
Assistant Examiner—Patrick W. Foster
Attorney, Agent, or Firm—Don J. Flickinger; Jordan M. Meschkow

[57] ABSTRACT

A tray secureable to the platform of a normally portable scales. The tray has a load receiving area substantially larger than the load receiving area of the platform. Also provided is an auxiliary base for stabilizing the scales when the greater load is received thereon. Attachment means are provided for securing the auxiliary base to the normal body supporting base of the scales. In another embodiment, the tray includes a generally planar central section having an upturned edge section extending from each of longitudinal edges. The tray may also include positioning means for receiving and centering a container for holding a quantity of fluent material. Further provided by the instant invention is a basket especially adapted for holding a quantity of relatively lightweight, yet bulky, material. The basket, in accordance with an embodiment thereof, includes a top surface for supporting the material, a bottom surface receivable upon the scales, a pair of spaced apart upstanding sides and handle means. Preferably, the handle means, which may be in the form of a manually graspable handle carried by each of the pair of sides, resides at the approximate balance point of the basket.

10 Claims, 5 Drawing Figures

U.S. Patent   Jul. 29, 1986   4,602,693
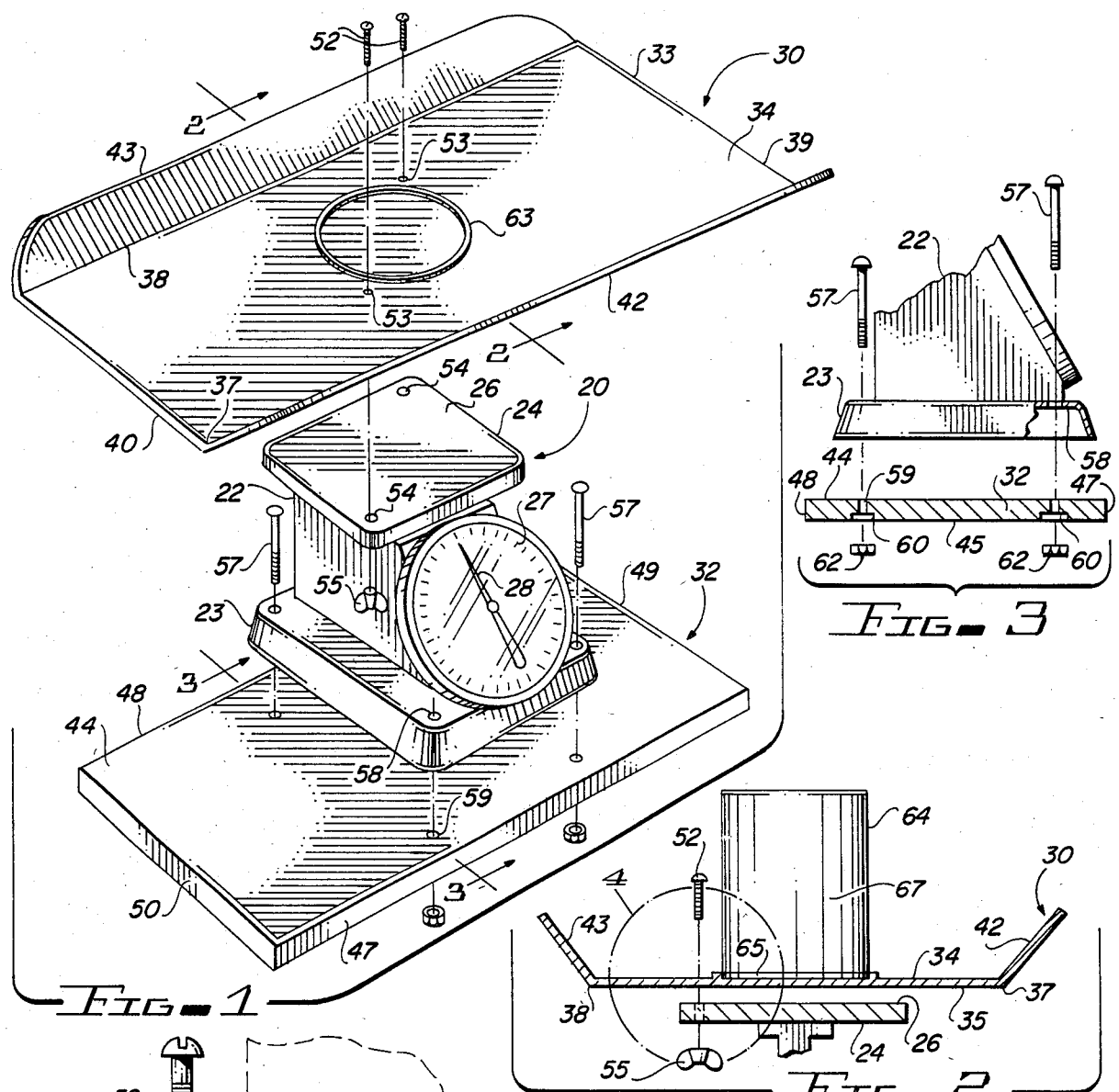
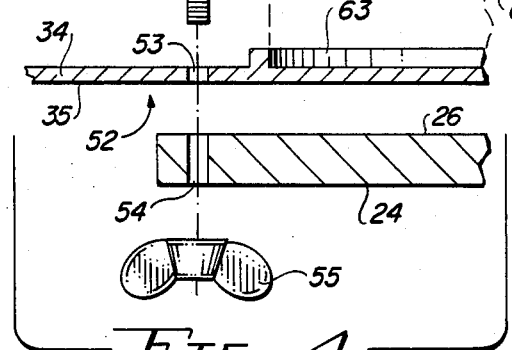
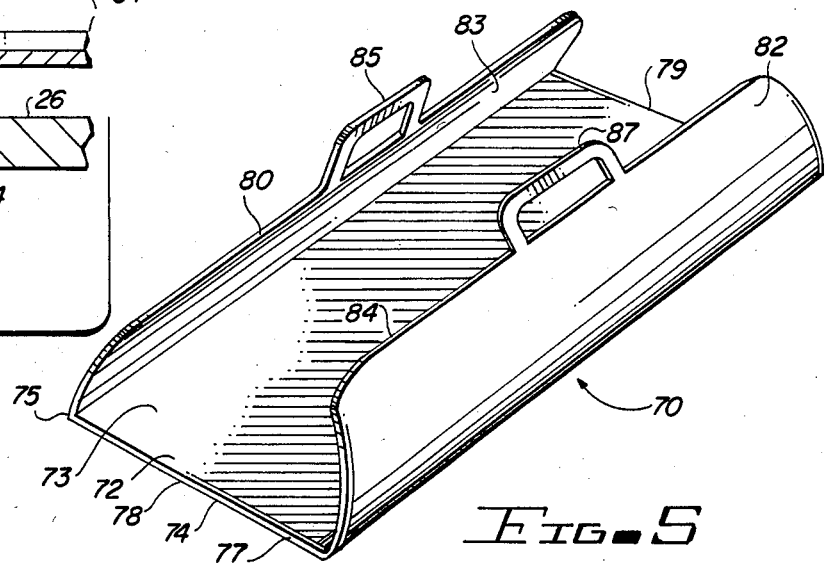

PORTABLE SCALES

BACKGROUND OF THE INVENTION

1. Field of the Invention

This invention relates to weighing devices.

In a further and more specific aspect, the instant invention concerns means for converting a conventional portable platform scales for weighing normally oversized bulky loads.

2. The Prior Art

Platform scales are a conventional, frequently used means for weighing sundry items. Briefly, the subject scales includes a body carried upon a supporting base. A platform, usually having a planar surface for receiving the load to be weighed, is borne by the body. Mechanism, generally internal to the body and sensitive to the load placed upon the platform, produces a visual display by moving a indicator relative a calibrated dial.

The prior art is replete with various platform scales. In general, for purposes of background in connection with the instant invention, such scales can be considered to be of two primary types. The classifications are stationary and portable.

Stationary scales tend to be massive, unwieldly devices of considerable weight especially adapted for holding and weighing loads of considerable size and weight. Exemplary are vehicle scales, such as those embedded in roadways for receiving trucks, capable of accommodating several tons. Smaller sized stationary scales are frequently utilized in warehouses for weighing cartons and crates. Although not readily transportable, scales of the immediate type may be fitted with wheels or rollers.

Portable scales are especially adapted to be moved from place to place. Generally weighing a few pounds or less and incorporating facilities for accommodating relatively light loads of compact size, such scales are conveniently, manually transportable. Postage scales, typically having a platform of a few square inches and a dial calibrated to two pounds, are an example of portable platform scales. Another example is the well-known "baby scales" which may handle as much as twenty pounds.

Platform size, which determines or limits the bulk or size of the load to be weighed, is one significant difference between portable scales and stationary scales. Another difference of consequence is the sensitivity. Large scales generally indicate pounds and frequently fractional parts of pounds. Portable scales, being smaller and having substantially greater sensitivity are usually calibrated in ounces and fractions thereof.

The foregoing types of scales, which are commercially available in numerous configurations, have failed to satisfy a need of long standing. There is frequent exigency to measure or apportion material of considerable bulk and minimal weight. Noted is animal feed such as hay, lucerne and other food plants. In the art of husbandry, especially during experimental care and feeding of animals, it is imperative that the feed be accurately rationed.

It is mandatory that the weighing device be sensitive, accurate and portable. The device may be transported to the stall of the individual animal. Alternately, the feed may be remotely apportioned if accommodations exist for secure transportation. Further, to adequately fulfill the need, a satisfactory husbandry scale must bulk granular commodities, such as grain.

It would be highly advantageous, therefore, to remedy the foregoing and other deficiencies inherent in the prior art.

Accordingly, it is an object of the present invention to provide improvements in portable weighing scales.

Another object of the invention is the provision of an improved portable scales of the platform type.

And another object of the invention is to provide means for accurately weighing relatively light weight, yet bulky loads.

Still another object of the invention is the provision of improvements which may be in kit form for use in connection with pre-existing commercially available scales.

Yet another object of the immediate invention is to provide an oversized platform and complimentary support base for a relatively compact, lightweight normally portable scales.

Yet still another object of the invention is the provision of a portable scales especially adapted for handling animal feed.

And a further object of this invention is to provide convenient means for the weighing and transportation of hay, lucerne and other grain-like commodities.

And still a further object of the instant invention is the provision of means for convenient weighing and transportation of fluent or bulk granular materials, such as grain.

And yet a further object of this invention is to provide a scales which is readily portable and easily usable.

Yet still a further object of the invention is the provision of an improved scales, according to the above, which is durably, yet inexpensively manufactured.

SUMMARY OF THE INVENTION

Briefly, to achieve the desired objects of the instant invention, in accordance with a preferred embodiment thereof, first provided is a tray secureable to the platform of a normally portable scales. The tray has a load receiving area substantially larger than the load receiving area of the platform. Also provided is an auxiliary base for stabilizing the scales when the greater load is received thereon. Attachment means are provided for securing the auxiliary base to the normal body supporting base of the scales.

In accordance with a further embodiment, the tray includes a generally planar central section having an upturned edge section extending from each of longitudinal edges. The tray may also include positioning means for receiving and centering a container for holding a quantity of fluent material.

Further provided by the instant invention is a basket especially adapted for holding a quantity of relatively lightweight, yet bulky, material. The basket, in accordance with a embodiment thereof, includes a top surface for supporting the material, a bottom surface receivable upon the scales, a pair of spaced apart upstanding sides and handle means. Preferably, the handle means, which may be in the form of a manually graspable handle carried by each of the pair of sides, resides at the approximate balance point of the basket.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings in which:

FIG. 1 is an exploded perspective view of an improved portable scales incorporating the principles of the instant invention, the improvement being shown in kit form for use in connection with a conventional platform scales.

FIG. 2 is a fragmentary, vertical, sectional view taken along the line 2—2 of FIG. 1.

FIG. 3 is a fragmentary, vertical, sectional view taken along the line 3—3 of FIG. 1.

Fig. 4 is an enlarged view of the area within the broken outline circle designated 4 in FIG. 2

FIG. 5 is a perspective view of a basket, constructed in accordance with the teachings of the instant invention, which is usable in connection with the improved scales of the instant invention or, alternately, with a conventional platform scales.

DETAILED DESCRIPTION OF THE PREFERRED EMBODIMENT

Turning now to the drawings in which like reference characters indicate corresponding elements throughout the several views, attention is first directed to FIG. 1 which illustrates a platform scales, generally designated by the reference character 20. Scales 20 includes body 22 upstanding from supporting base 23 and carrying platform 24. Base 23 is substantially planar on the undersurface for bearing upon a supporting surface while platfom 24 includes generally planar top surface 26 for receivng a load to be weighed thereon. Calibrated dial 27 and cooperating indicator 28 is carried by body 22.

Platform scales 20, herein illustrated for purposes of understanding and orientation in connection with the instant invention, is intended to be typically representative of commercially available devices of the described type. In general, such scales are relatively compact, lightweight and considered to be portable. The load receiving surface of the platform is usually not larger than the base. Such devices are also characterized as being highly accurate, usually having a capacity of 30 pounds or less, with calibrations indicating pounds, ounces and fractional parts of ounces. Such scales, which are commonly commercially available and frequently utilized for weighing postage, babies, small packages and like sized items, are exemplified by the scales distributed by the J. C. Penney Company and identified as Nursery Scale Model R 343-0014 A. Details of such scales not specifically described herein, will be readily apparent and known by those skilled in the art.

The instant invention, in accordance with a preferred embodiment thereof, provides a kit including a tray generally designated by the reference character 30 and an auxiliary base generally designated by the reference character 32 for converting scales 20 to accept and weigh a normally over sized load. Tray 30, as seen with further reference to FIG. 2, includes an elongate generally planar central section 33 having a top surface 34 for receiving the load thereon and an under surface 35 which is received upon the top surface 26 of platform 24. Central section 33 further includes longitudinal edges 37 and 38, and ends 39 and 40. Upturned edge sections 42 and 43 extend along longitudinal edges 37 and 38, respectively.

Auxiliary base 32, as seen with further reference to FIG. 3, is generally planar having top surface 44 for receiving supporting base 23 thereon and under surface 45 for bearing upon a supporting surface. Auxiliary base 32 further includes longitudinal edges 47 and 48, and ends 49 and 50.

First attachment means for detachably securing tray 30 to platform 24 includes a pair of machine screws 52 which extend through respective openings 53 in central section 33 and aligned openings 54 extending through platform 24 and secured by wing nuts 55. While only one wing nut 55 is herein shown, it will be immediately apparent that a second wing nut is also required. The first attachment means is also seen with reference to FIG. 4. While additional machine screws may be used, two placed in diagonally opposite corners of the generally rectangular platform 24 are considered sufficient for the immediate purpose.

Second attachment means, for detachably securing supporting base 23 to auxiliary base 32 includes machine screws 57 extending through openings 58 in supporting base 23 and aligned openings 59 in auxiliary base 32. As further seen with reference to FIG. 3, each opening 59 includes a counterbore 60 from under surface 45. Each counterbore 60 is sized to receive a nut 62 therein. Nuts 62 are threadedly engageable with machine screws 57. Accordingly, surface 45 remains flush and free from obstructions. While any number of machine screws 57 may be used in accordance with personal preference, the immediately preferred embodiment illustrates four such screws, one located at each corner of supporting base 23. It is also apparent that auxiliary base 32 may be drilled and tapped to directly threadedly receive machine screws 57.

An important relationship exists between tray 30 and auxiliary base 32. It is noted that the portions of tray 32 extending inwardly from the respective ends 39 and 40 are cantilevered from platform 24. The ends 49 and 50 of auxiliary base 32 extend in respective directions from supporting base 23 distances sufficient to stabilize the improved scales against an unbalanced load placed upon the cantilevered sections. In accordance with a preferred embodiment of the invention, auxiliary base 32 is substantially the same length as tray 30.

Referring again to FIG. 1, there is seen an annular ridge 63 upstanding from the proximate mid-point of central section 33 of tray 30. Ridge 63 functions as positioning means for container 64 as better seen in FIG. 2. Container 64 includes bottom 65 and continuous sidewall 67 which in accordance with the immediately preferred embodiment of the invention is generally cylindrical. Bottom 65 is receivable upon top surface 34 of tray 30. Ridge 63 encircles the perimeter of sidewall 67 in order to provide positioning means for substantially centering container 64 over platform 24. Reference is also made to FIG. 4 which illustrated ridge 63 in enlarged detail. Container 64 is especially devised for handling fluent material such as liquids and grains. Weighing accuracy is assured by substantially centering container 64 upon platform 24.

Referring now to FIG. 5 there is seen a basket generally designated by the reference character 70 especially adapted for transporting a quantity of bulk commodity. Basket 70 includes a bottom 72 having top surface 73 for supporting the quantity of bulk material, and a bottom surface 74 which is receivable upon the platform of a scales. In the immediately preferred embodiment, bottom 72 is generally elongate having a pair of spaced apart longitudinal edges 75 and 77, and opposite ends 78 and 79.

Sides 80 and 82 extend upwardly inward from respective edges 75 and 77. Side 80 terminates with upper edge 83. Similarly, side 82 terminates with upper edge 84. Manually graspably handles 85 and 87 project from the substantial mid-point of the edges 80 and 84, respectively. The handles 85 and 87 function as handle means for lifting and transporting basket 70 at the substantial balance point thereof.

In accordance with the immediately preferred embodiment of the instant invention, basket 70 is sized and shaped to be received within tray 30. That is, bottom 72 is sized to be received between edge sections 42 and 43. It will be immediately apparent to those skilled in the art that basket 70 may be alternately shaped and is readily usable with conventional pre-existing platform scales not incorporating the improvements seen in FIG. 1.

Various changes and modifications to the embodiment herein chosen for purposes of illustration will readily occur to those skilled in the art. Several such modifications and changes have been set forth throughout the description. Other modifications are readily apparent. For example, tray 30 and basket 70 may be provided with upturned end sections similar to the illustrated upturned edge sections. Further, the device may be fabricated of various materials chosen in accordance with preference for manufacturing and materials to be handled. Such materials include sheet metal and plastic which may be variously molded, stamped or cast. To the extent that such modifications and variations do not depart from the spirit of the invention, they are intended to be included within the scope thereof which is assessed only with a fair interpretation of the following claims.

Having fully described and disclosed the present invention, and alternately preferred embodiments thereof, in such clear and concise terms as to enable those skilled in the art to understand and practice the same, the invention claimed is:

1. In a scale, which scale is normally portable and especially adapted for weighing smaller sized loads, which scale includes:
   a platform having a finite load receiving area, and
   a supporting base,
improvements therein for converting said scale to accept and weigh a normally oversized load, said improvements comprising:
   a. a tray for coupling to said platform having a substantially greater load receiving area than the load receiving area of said platform;
   b. first attachment means for securing said tray to said platform;
   c. an auxiliary base for coupling to said supporting base for stabilizing said scale when said greater load is received upon said tray; and
   d. second attachment means for securing said auxiliary base to said supporting base.

2. The improvements of claim 1, wherein said tray includes:
   a. an elongate generally planar central section having a pair of spaced apart longitudinal edges; and
   b. an upturned edge section extending along each of said pair of longitudinal edges.

3. The improvements of claim 1, wherein:
   a. said tray includes a cantilevered portion extending from said platform; and
   b. said auxiliary base is sized to counterbalance said scale when a load is placed upon said cantilevered portion.

4. The improvements of claim 1, wherein:
   a. said first attachment means detachably secures said tray to said platform; and
   b. said second attachment means detachably secures said auxiliary base to said base.

5. The improvements of claim 1, further including:
   a. a container for holding a quantity of fluent material; and
   b. positioning means carried by said tray for receiving and substantially centering said container over said platform.

6. The improvements of claim 5, wherein:
   a. said container includes i. a bottom receivable upon said tray, and ii. a perimeter; and
   b. said positioning means includes means upstanding from said tray for receiving the perimeter of said container therein.

7. The improvements of claim 1, further including a basket positionable upon said tray for weighing and for transportation of a load.

8. The improvements of claim 7, wherein said basket includes
   a. a bottom having a pair of spaced apart longitudinal edges;
   b. a side extending upwardly from each of said pair of edges; and
   c. handle means for lifting said basket.

9. The improvements of claim 8, wherein said handle means includes a manually graspable handle carried by each of said sides.

10. The improvements of claim 8, wherein the bottom of said basket has a size and shape which is substantially coincident with the size and shape of said tray.

* * * * *